US007843444B2

(12) United States Patent
Huang et al.

(10) Patent No.: US 7,843,444 B2
(45) Date of Patent: Nov. 30, 2010

(54) VIDEO GRAPHICS ARRAY INTERFACE TESTER

(75) Inventors: Fa-Sheng Huang, Shenzhen (CN); Shang-Yang Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 567 days.

(21) Appl. No.: 11/861,313

(22) Filed: Sep. 26, 2007

(65) Prior Publication Data

US 2009/0024380 A1    Jan. 22, 2009

(30) Foreign Application Priority Data

Jul. 17, 2007    (CN) .................... 2007 1 0201095

(51) Int. Cl.
*G06F 3/038* (2006.01)
(52) U.S. Cl. .................... 345/204; 345/11; 345/698
(58) Field of Classification Search ............. 345/10–14, 345/19, 22, 42, 48, 51, 53–54, 94, 104, 204, 345/208–214, 698; 324/404–407, 542, 555–556, 324/771; 348/180–181, 184, 189, 192–194; 703/20–21; 714/43, 48, 754
See application file for complete search history.

(56) References Cited

U.S. PATENT DOCUMENTS

| | | | | | |
|---|---|---|---|---|---|
| 5,841,430 | A | * | 11/1998 | Kurikko | 345/213 |
| 5,923,322 | A | * | 7/1999 | Kim | 345/204 |
| 6,219,039 | B1 | * | 4/2001 | Chang et al. | 345/204 |
| 6,323,828 | B1 | * | 11/2001 | Perez | 345/10 |
| 6,661,412 | B1 | * | 12/2003 | Jun, II | 345/204 |
| 6,819,114 | B2 | * | 11/2004 | Cheng et al. | 324/407 |
| 7,696,956 | B2 | * | 4/2010 | Deng et al. | 345/10 |

FOREIGN PATENT DOCUMENTS

| CN | 2862190 Y | 1/2007 |
|---|---|---|
| CN | 1963775 A | 5/2007 |

* cited by examiner

*Primary Examiner*—Henry N Tran
*Assistant Examiner*—Mansour M Said
(74) *Attorney, Agent, or Firm*—Frank R. Niranjan

(57) ABSTRACT

An exemplary video graphics array interface tester includes a VGA connector being configured to couple to a VGA interface to be tested and having a plurality of signal pins to output different VGA signals; a load circuit connected to the signal pins of the VGA connector for impedance matching; a selection switch having a plurality of throws corresponding to the signal pins of the VGA connector connected to the signal pins of the VGA connector respectively, and a pole; and a test port connected to the pole of the selection switch for selectively testing one of the VGA signals via selection of the selection switch. Using this tester to detect the VGA interface can guarantee quality and improve efficiency of VGA test.

3 Claims, 1 Drawing Sheet

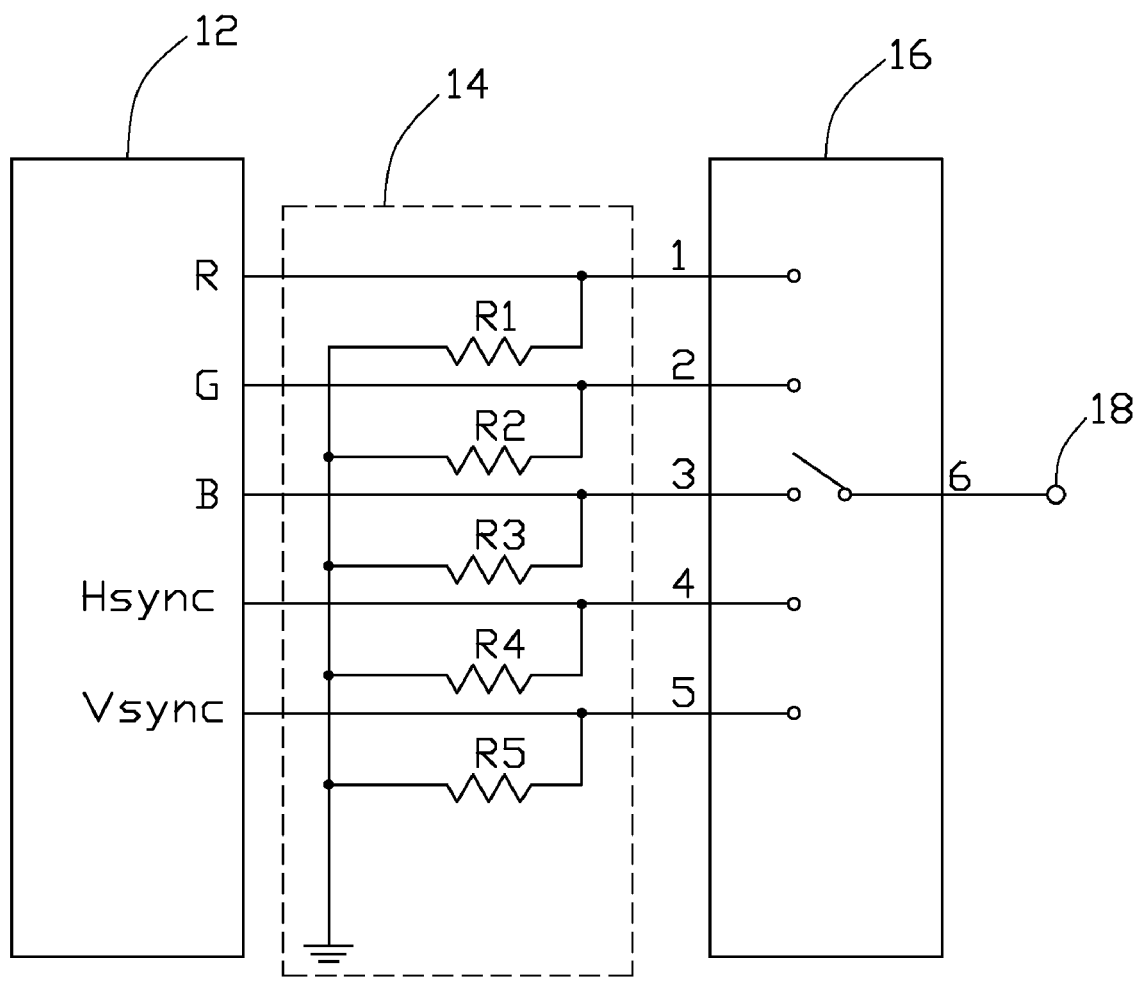

VIDEO GRAPHICS ARRAY INTERFACE TESTER

BACKGROUND

1. Field of the Invention

The present invention relates to testers, and particularly to a video graphics array interface tester.

2. Description of Related Art

In a personal computer (PC) manufacturing environment, a large number of PCs are produced daily. Therefore, it is highly desirable for factory testing personnel, as well as development engineers, to be able to quickly and reliably test the basic functionality of, for example, the video subsystem of every PC. One method of accomplishing this task is to connect a monitor to the PC and boot it up. During POST (Power On Self Test), an audible "beep code" will be output to indicate the status of the video subsystem; however, the status indicated by this beep code often does not reveal the true status of the video subsystem.

Accordingly, what is needed is a simple, convenient, and reliable device to perform video subsystem testing of a PC in a manufacturing environment.

SUMMARY

An exemplary video graphics array interface tester includes a VGA connector having a plurality of signal pins to output different VGA signals; a load circuit connected to the signal pins of the VGA connector for impedance matching; a selection switch having a plurality of throws corresponding to the signal pins of the VGA connector connected to the signal pins of the VGA connector respectively, and a pole; and a test port connected to the pole of the selection switch for selectively testing one of the VGA signals via selection of the selection switch.

Other advantages and novel features will become more apparent from the following detailed description when taken in conjunction with the accompanying drawing, in which:

BRIEF DESCRIPTION OF THE DRAWINGS

The drawing is a circuit diagram of one embodiment of a video graphics array interface tester in accordance with the present invention.

DETAILED DESCRIPTION

Referring to the drawing, a video graphics array (VGA) interface tester in accordance with an embodiment of the present invention includes a connector 12 having a plurality of signal pins, a load circuit 14, a selection switch 16, and a test port 18. The load circuit 14 is connected to the signal pins of the connector 12 for impedance matching. The selection switch 16 is connected between the connector 12 and the test port 18 to selectively connect one of the signal pins of the connector 12 to the test port 18. The test port 18 can be coupled with an oscilloscope or a monitor to display the signal transmitted by the connector 12.

In this embodiment, the connector 12 is a VGA connector having a red signal pin R, a green signal pin G, a blue signal pin B, a horizontal synchronization signal pin Hsync, and a vertical synchronization signal pin Vsync. The load circuit 14 includes five resistors R1~R5 connected between the signal pins of the connector 12 and ground respectively. The selection switch 16 has five throws 1~5 connected to the signal pins of the connector 12 respectively, and a pole 6 connected to the test port 18.

Resistance of each of the resistors R1~R3 of the load circuit 14 is approximately 75 ohms and resistance of each of the resistors R4~5 of the load circuit 14 is approximately 2.2 Kohms for impedance matching.

When the connector 12 is coupled with a VGA interface of a computer which needs to be tested, the VGA signals are transmitted to the selection switch 16 via the connectors 2. An operator may select one of the red, green, blue, horizontal synchronization, and vertical synchronization signals to be displayed on the monitor by operating the selection switch 16. Using this tester to detect the VGA interface can guarantee quality and improve efficiency of VGA test.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A Video Graphics Array (VGA) interface tester for testing a VGA interface, comprising:
    a VGA connector configured to couple to the VGA interface, the VGA connector having a plurality of signal pins to output different VGA signals, the signal pins comprising a red signal pin, a green signal pin, a blue signal pin, a horizontal synchronization signal pin, and a vertical synchronization signal pin;
    a load circuit connected to the signal pins of the VGA connector for impedance matching, the load circuit comprising five resistors connected between the signal pins of the VGA connector and ground respectively;
    a selection switch having a plurality of throws corresponding to the signal pins of the VGA connector connected to the signal pins of the VGA connector respectively, and a pole; and
    a test port connected to the pole of the selection switch for selectively testing one of the VGA signals via selection of the selection switch;
    wherein resistance of each of the three resistors connected to the red, green, and blue signal pins of the VGA connector respectively is 75 ohms, and resistance of each of the rest of the resistors connected to the horizontal synchronization and vertical synchronization signal pins of the connector respectively is 2.2 Kohms.

2. The VGA interface tester as claimed in claim 1, further comprising an oscilloscope connected to the test port to display the selected one of the VGA signals.

3. The VGA interface tester as claimed in claim 1, further comprising a monitor connected to the test port to display the selected one of the VGA signals.

* * * * *